United States Patent
Kuwano et al.

(10) Patent No.: US 7,055,499 B1
(45) Date of Patent: Jun. 6, 2006

(54) INTERNAL MODULE, MEMBERS OF THE MODULE, AND ELECTRONIC CONTROLLED THROTTLE DEVICE FOR INTERNAL COMBUSTION ENGINE

(75) Inventors: Morio Kuwano, Tomobe (JP); Shigeto Niitsuma, Mito (JP); Mitsunori Nishimura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 10/416,963

(22) PCT Filed: Nov. 17, 2000

(86) PCT No.: PCT/JP00/08145

§ 371 (c)(1),
(2), (4) Date: May 16, 2003

(87) PCT Pub. No.: WO02/40846

PCT Pub. Date: May 23, 2002

(51) Int. Cl.
*F02D 11/10* (2006.01)
*F02M 35/10* (2006.01)

(52) U.S. Cl. .................. 123/399; 123/337; 123/184.61

(58) Field of Classification Search ........... 123/184.61, 123/184.38, 184.42, 399, 337, 634, 635, 123/647
See application file for complete search history.

(56) References Cited

U.S. PATENT DOCUMENTS

| | | | |
|---|---|---|---|
| 4,932,369 A * | 6/1990 | Parr ....................... | 123/184.42 |
| 5,341,773 A | 8/1994 | Schulte et al. | |
| 5,636,605 A * | 6/1997 | Nomizo et al. ........ | 123/184.61 |
| 5,803,050 A | 9/1998 | Osakabe et al. | |
| 6,032,633 A | 3/2000 | Wada | |
| 6,070,462 A * | 6/2000 | Igarashi et al. .......... | 73/204.22 |
| 6,267,093 B1 * | 7/2001 | Lohr ..................... | 123/184.61 |
| 6,343,583 B1 * | 2/2002 | Nishida .................. | 123/184.38 |
| 6,571,759 B1 * | 6/2003 | Homi ..................... | 123/184.47 |
| 6,581,561 B1 * | 6/2003 | Brodesser et al. ..... | 123/184.34 |
| 6,681,742 B1 * | 1/2004 | Hirayama et al. .......... | 123/399 |
| 6,701,892 B1 * | 3/2004 | Wayama et al. ............ | 123/399 |
| 6,725,833 B1 * | 4/2004 | Irihune et al. .............. | 123/399 |
| 6,745,739 B1 * | 6/2004 | Fujihira et al. ........ | 123/184.21 |
| 6,782,862 B1 * | 8/2004 | Homi ..................... | 123/184.47 |
| 6,802,293 B1 * | 10/2004 | Iwata et al. ............ | 123/184.42 |

(Continued)

FOREIGN PATENT DOCUMENTS

DE 19854594 5/2000

(Continued)

OTHER PUBLICATIONS

Search Report.

(Continued)

Primary Examiner—Hai Huynh
(74) Attorney, Agent, or Firm—Crowell & Moring LLP

(57) ABSTRACT

An internal combustion engine intake module, members thereof and electronically controlled throttle apparatus for a car and related products characterized by great strength, and light weight and compact configuration wherein the weight of the electronically controlled throttle apparatus and motor to be connected is reduced. The internal combustion engine intake module of the present invention comprises a collector, an electronically controlled throttle body connected to the collector, and a plurality of intake manifolds connected in parallel integrally with the collector. It is characterized in that the collector is bent upward on the side of the electronically controlled throttle body, and a motor for driving the electronically controlled throttle is provided on the body integrally with the inner side of the bent side. It is further characterized in that the intake manifolds are made of synthetic resin containing a fiber or aluminum group alloy casting.

12 Claims, 8 Drawing Sheets

U.S. PATENT DOCUMENTS

| | | | |
|---|---|---|---|
| 2001/0045206 A1* | 11/2001 | Smith et al. | 123/478 |
| 2003/0221651 A1* | 12/2003 | Ito et al. | 123/184.61 |
| 2004/0154574 A1* | 8/2004 | Menin | 123/184.42 |

FOREIGN PATENT DOCUMENTS

| | | |
|---|---|---|
| JP | 62-52234 | 4/1987 |
| JP | 1-113156 | 7/1989 |
| JP | 3-149326 | 6/1991 |
| JP | 03-202670 | 9/1991 |
| JP | 3-271557 | 12/1991 |
| JP | 06-081719 | 3/1994 |
| JP | 07-083132 | 3/1995 |
| JP | 7-166876 | 6/1995 |
| JP | 07-301163 | 11/1995 |
| JP | 8-254129 | 10/1996 |
| JP | 10-47176 | 2/1998 |
| JP | 10-252588 | 9/1998 |
| JP | 10-281026 | 10/1998 |
| WO | WO00/58614 | * 10/2000 |

OTHER PUBLICATIONS

European Search Report dated Jul. 7, 2005.

* cited by examiner

INTERNAL MODULE, MEMBERS OF THE MODULE, AND ELECTRONIC CONTROLLED THROTTLE DEVICE FOR INTERNAL COMBUSTION ENGINE

BACKGROUND OF THE INVENTION

1. Field of the Invention

The present invention relates to an internal combustion engine intake module, members thereof and electronically controlled throttle apparatus of a new car or similar products.

2. Description of the Prior Art

To ensure small size and compact configuration and to improve packaging density in the intake system of an internal combustion engine of a car, various techniques have been proposed to use synthetic resins for an intake manifold and a collector (surging tank), to mold them in an integrated form, and hence to incorporate a throttle valve, collector, intake manifold, injector and related parts into one module. The prior arts of internal combustion engine intake module are disclosed, for example, in the Japanese Application Patent Laid-Open Publication No. 03-202670, Japanese Application Patent Laid-Open Publication No. 06-81719, Japanese Application Patent Laid-Open Publication No. 07-301163, Japanese Application Patent Laid-Open Publication No. 07-83132, and Japanese Application Patent Laid-Open Publication No. 10-281026. In the Japanese Application Patent Laid-Open Publication No. 03-202670, it is shown that the collector and intake manifold are composed of synthetic resin, and the engine side of the intake manifold is made of metal. The Japanese Application Patent Laid-Open Publication No. 10-281026, it is revealed that the collector and intake manifold are composed of synthetic resin.

In any of the known examples, however, no reference is made to a specific relationship with an electronically controlled throttle apparatus connected to the collector.

SUMMZRY OF THE INVENTION

The object of the present invention is to provide an internal combustion engine intake module, members thereof and electronically controlled throttle apparatus for a car and related products characterized by great strength, and light weight and compact configuration wherein the weight of the electronically controlled throttle apparatus and motor to be connected is reduced.

The present invention is concerned with an internal combustion engine intake module composed of the specific structure, members thereof and electronically controlled throttle apparatus. In particular, the present invention is concerned with an internal combustion engine intake module comprising an intake manifold made of synthetic resin containing fibers and a collector, wherein the internal combustion engine intake module is integrated with the electronically controlled throttle drive motor, and is arranged on the intake manifold side.

For example, when a blow-by gas passage for leading air from an electronically controlled throttle body flange to the synthetic resin-made collector is arranged outside the intake manifold connected to each cylinder (on the so-called an internal combustion engine intake module side), the mounting flange of the electronically controlled throttle body is located in the direction away from the gravity center of the internal combustion engine intake module. The gravity center of the internal combustion engine intake module with a motor arranged thereon is far removed from the center gravity of the intake manifold. In this case, the passage for leading air from the electronically controlled throttle body flange to the synthetic resin-made collector must be made robust against the engine vibration or the like.

To solve this problem, the motor of the electronically controlled throttle body motor is arranged on the intake manifold side, and the aforementioned passage is tilted or bent 45 degrees or more. This arrangement ensures that the center gravity of the electronically controlled throttle body is brought closer to the gravity center of the intake manifold. It also alleviate the need of reinforcing of the aforementioned passage for leading air from the electronically controlled throttle body flange to the collector, or eliminates the need of reinforcement. Accordingly, it is preferred that the intake manifold flange be arranged in a descending slope as viewed from the intake manifold side, and that the collector, intake manifold and passage connecting them be made of synthetic resin, especially the one containing fiber, or low glass fiber characterized by low thermal expansion. In addition, carbon fiber, ceramic fiber and metallic fiber are preferred.

This configuration ensures that the gravity center of the electronically controlled throttle body with a motor mounted thereon can be brought close to the gravity center of the resin-made intake manifold, and provides the strength of the passage for leading air from the electronically controlled throttle body flange to the synthetic resin-made collector.

To be more specific, the present invention provides an internal combustion engine intake module comprising:

a collector, an electronically controlled throttle body connected to this collector, and a plurality of intake manifolds connected in parallel integrally with this collector;

the aforementioned internal combustion engine intake module further characterized in that the collector is bent upward on the side of the electronically controlled throttle body, and a motor for driving the electronically controlled throttle is provided on the aforementioned body integrally with the inner side of the aforementioned bent side;

the aforementioned collector has a slope that is upwardly tilted 45 degrees or more on the electronically controlled throttle body side, the diameter of the slope is smaller than that of the intake manifold and is almost the same on the electronically controlled throttle body side and the intake manifold side, and the motor for driving the electronically controlled throttle is provided integrally with the inner side of the aforementioned bent side;

the collector and intake manifolds are made of synthetic resin containing a fiber and the intake manifolds are partly integrally formed by bondage; or the aforementioned internal combustion engine intake module is composed of these combinations.

Further, the present invention provides an internal combustion engine intake module where a plurality of intake manifolds arranged in parallel to a collector are connected with an electronically controlled throttle body;

the aforementioned internal combustion engine intake module characterized in that the aforementioned intake manifolds are divided into at least two groups, i.e. on the engine side and collector side, and the collector and intake manifolds on the collector side are made of synthetic resin containing a fiber;

the intake manifolds are divided into at least two groups, i.e. on the engine side and collector side, the collector and intake manifolds on the collector side are made of synthetic resin containing a fiber, the intake manifolds on the engine side is made of aluminum group alloy casting;

the collector and intake manifolds are made of synthetic resin, and an air flow meter for detecting the amount of sucked air is arranged on the aforementioned body on the side opposite to the engine; or the aforementioned internal combustion engine intake module is composed of these combinations.

The present invention further provides an internal combustion engine intake module where a plurality of intake manifolds arranged in parallel to a collector are connected with an electronically controlled throttle body;

the aforementioned internal combustion engine intake module characterized in that the collector and intake manifolds are made of synthetic resin, the wiring connector of the motor for driving the electronically controlled throttle body and the wiring connector of the rotary angle sensor of the throttle are formed integrally with each other, and the aforementioned integrally formed connector has its terminal inlet arranged on the body opposite to the engine;

the collector and intake manifolds are made of synthetic resin, the wiring connector of the motor for driving the electronically controlled throttle and the wiring connector of the rotary angle sensor of the throttle are formed integrally with each other, the aforementioned integrally formed connector has its terminal inlet arranged on the body opposite to the engine, and the direction of the inlet of the terminal to wiring connector of an air flow meter for detecting the amount of sucked air is arranged in the same direction as the terminal inlet to the integrally formed connector, the harness with an integral unit comprising wires is fixed on the top of the intake manifold, the aforementioned wires consisting of;

a wire connected to the motor for driving the throttle rotatably installed on the body, a wire leading to the sensor for detecting the rotary angle of the throttle, a wire leading to the air flow meter for detecting the amount of sucked air, a wire leading to the fuel injection valve installed on the intake manifold, a wire leading from the engine control unit, and a wire leading to a spark plug installed on the engine; or the aforementioned internal combustion engine intake module is composed of these combinations.

Further, the present invention provides an internal combustion engine intake module comprising a plurality of intake manifolds arranged in parallel to a collector and a variable intake valve arranged on each of the intake manifolds between the collector and intake manifold, the aforementioned internal combustion engine intake module characterized in that the collector and intake manifolds are made of synthetic resin containing a fiber and the intake manifolds are integrally formed by bondage;

wherein the aforementioned internal combustion engine intake module comprises:

a plurality of intake manifolds arranged in parallel to the collector, a variable intake valve arranged on each of the intake manifolds between the collector and intake manifold, and a negative pressure tank as a drive source of the variable intake valve;

the aforementioned internal combustion engine intake module further characterized in that the collector, intake manifolds and negative tank are made of synthetic resin containing a fiber, and the intake manifolds and negative tank are integrally formed by bondage; or the collector, intake manifolds and negative tank are made of synthetic resin containing a fiber, the intake manifolds and negative tank are integrally formed by bondage, and an engine control unit is installed on the engine side of the intake manifold; or the aforementioned internal combustion engine intake module is composed of these combinations.

Further, the present invention provides members for an internal combustion engine intake module of an internal combustion engine comprising a plurality of intake manifolds arranged in parallel to a collector, wherein;

the collector and intake manifolds are made of synthetic resin containing a fiber, each of intake manifolds has a flange for connection with other intake manifold on the side connected to the engine, and the intake manifolds are integrally formed by bondage; or the intake manifolds are divided into at least two groups, i.e. on the side connected to the engine side and the side connected to the collector, the intake manifolds on the collector side are made of synthetic resin containing a fiber, while those on the engine side are made of aluminum group alloy, with both of these groups connected by a rubber-made connecting pipe, and the outer periphery of the rubber-made connecting pipe is fixed by a metallic band.

The present invention provides intake manifolds for an internal combustion engine intake module of an internal combustion engine comprising:

a shell, a flange on one end of this shell for connection with the engine side, a flange on the other end for connection with another intake manifold, and a mount for a fuel injection valve arranged on the engine side; wherein the flange for connection with the intake manifold is thicker than the shell and the entire body consists of an aluminum group alloy.

The present invention further provides an electronically controlled throttle apparatus for an internal combustion engine comprising:

a throttle rotatably installed on the body, a motor for driving this slot, a connector for wiring this motor a sensor for detecting the rotary angle of this slot, and a connector for wiring this sensor;

wherein the body and motor housing are made of aluminum group alloy casting, the motor is arranged on the intake manifold side, the motor wiring connector and sensor wiring connector consist of one integrated connector, and the terminal inlet of this integrated connector is located on the sided opposite to the engine;

an air flow meter for detecting the amount of sucked air is arranged thereon, the body and motor housing are made of an integrated aluminum group alloy casting, the motor is arranged on the intake manifold side, and the motor is installed on the body on the intake manifold side, while the air flow meter is mounted on the body on the side opposite to the engine;

air flow meter wiring connectors are arranged thereon, the body and motor housing are made of an integrated aluminum group alloy casting, the air flow meter is arranged on the aforementioned body on the side opposite to the engine, and the terminal inlet of the wiring connector of this air flow meter; or the aforementioned throttle is composed of these combinations.

In an internal combustion engine intake module of an internal combustion engine according to the present invention, the motor and air flow meter with respect to the electronically controlled throttle body are arranged at a specified position. This arrangement reduces the load on the weight of the electronically controlled throttle body and motor thereof in particular, and allows the intake manifold and collector to be formed with synthetic resin, with the result that a lightweight and compact internal combustion engine intake module can be obtained. Further, when their wiring and collector are arranged at a specified position, the wiring length can be reduced and, at the same time, the wiring production process can be curtailed. Moreover, this arrangement improves the reliability of the wiring and the entire system.

DESCRIPTION OF THE PREFERRED EMBODIMENTS

Figure 6:
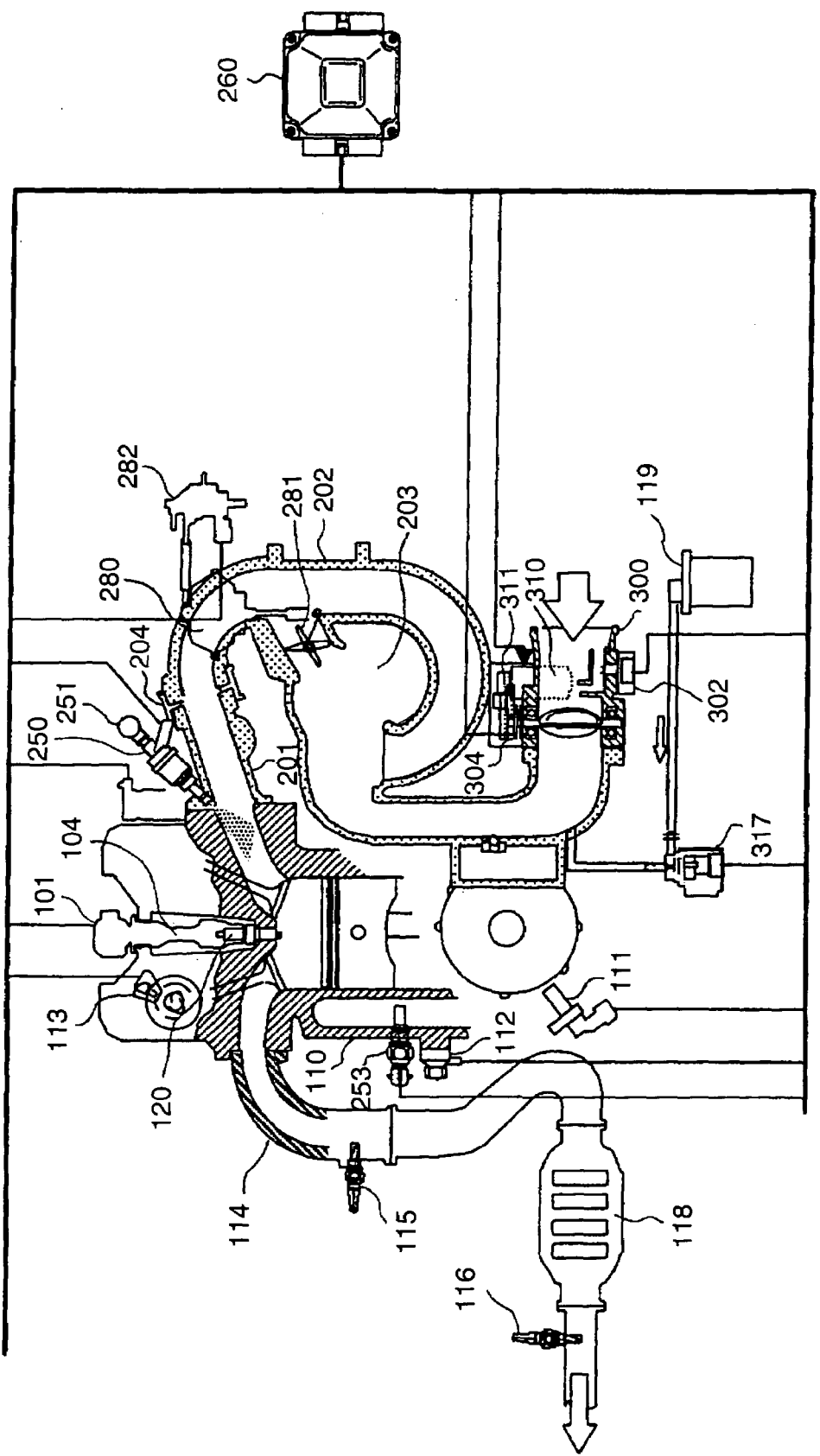
FIG. 6 is an outline view of an engine system to which the present invention applies.

FIG. 6 is an outline view of an engine system to which an internal combustion engine intake module of automotive internal combustion engine according to the present invention applies.

In FIG. 6, a cylinder 110 of an engine block 100 denotes one of multiple cylinders. Numerals 201 and 202 are independent intake pipes constituting an intake manifold. The intake manifold is composed of independent intake pipes in the number corresponding to that of the cylinders. This independent intake pipe 202 comprises a variable intake valve 281 that is opened or closed by a negative pressure diaphragm 280. A three-way solenoid valve 282 is switched by the signal sent from an engine control unit (hereinafter referred to as "ECU") 260, and negative pressure to the negative pressure diaphragm 280 is switched, whereby the variable intake valve 281 is actuated to get the length of the intake pipe appropriate to the engine loaded status. Numeral 203 denotes a collector (surging tank) positioned upstream from the intake manifold, and 300 indicates an electronically controlled throttle body equipped with a built-in throttle valve.

The electronically controlled throttle body 300 incorporates a throttle position sensor (hereinafter referred to as "TPS") 304 as a measuring system, and also contains an air flow meter (hereinafter referred to as "FM") 302 for detecting the amount of sucked air. The electronically controlled throttle body 300 is provided with a motor 310 and a gear 311 for opening and closing the throttle valve.

The independent intake pipes 201 and 202 are connected with the suction port of the cylinder 110 branched off from the collector 203.

Air captured from an air cleaner (not illustrated) is flow-controlled by the throttle valve of the electronically controlled throttle body 300, and is then lead to the collector 203. It is fed into the cylinder 110 located in the intake process through the independent intake pipes (intake manifolds) 201 and 202.

An injector (fuel injection valve) 250 is arranged close to the suction port of the cylinder 110, and serves to inject fuel in response to the control signal from the ECU 260.

The injector 250 is supplied with fuel through the fuel gallery (fuel supply pipe).

In this example, an independent ignition type ignition coil 104 is directly connected to the spark plug mounted on the cylinder head. The independent ignition type ignition coil 10 is mounted inside the plughole and an igniter unit (ignition drive circuit) 101 is installed thereon. Ignition signal is sent directly from the ECU to the igniter unit 101 to provide ignition control.

Numeral 111 denotes a crank angle sensor, 112 a knock sensor for detecting engine knocking, 113 a cam angle sensor, 115 and 116 oxygen sensors provided on the exhaust pipe 114. The oxygen sensors 115 and 116 provide air-fuel ratio control. Since they are placed before and after the catalyst 118, they detect the deterioration of the catalyst performance.

Numeral 253 is a warm water sensor for detecting the engine coolant. Signals detected by these sensors and AFM are sent to the ECU 260 through the harness. The ECU 260 provides the function of computing the amount of fuel and ignition timing in conformity to the current engine status based on various measurement signals and sensor signals.

Part of the engine coolant is fed through the passage provided on the throttle valve via the warm water piping, thereby giving heat to the throttle body and preventing the throttle valve from being frozen. Warm water (engine coolant) is fed back to the engine cooler through the reserve tank and feedback pipe.

Numeral 119 denotes a canister for recovering the evaporated gas of the fuel tank. The evaporated gas recovered by the canister 19 is sent to the collector 203 through the canister purge calve 317 and canister purge pipe.

The canister purge calve 317 is also controlled through the ECU 260.

Further, the electronically controlled throttle body 300 is provided with a PCV valve 322 used for the blow-by gas reducer (positive crankcase ventilation; hereinafter referred to as "PCV valve") and a fresh air outlet. The PCV is provided to ensure that the blow-by gas taken out of the cylinder head cover or crankcase is fed back to the passage of the air intake system. If blow-by gas is placed in the intake mode under reduced load when there is little generation of blow-by gas, the suction force by negative pressure from the manifold becomes excessive to cause an engine trouble. This problem can be avoided by using a PCV valve designed in such a structure that the PCV ventilation area is controlled by negative pressure. The blow-by gas is fed downstream from the throttle valve in response to the engine load (sucked air flow rate). Further, fresh air is fed into the cylinder head cover or crankcase through the fresh air outlet and hose connected thereto from the air intake system upstream from the throttle valve at that time, whereby ventilation is provided.

The following describes an internal combustion engine intake module of the internal combustion engine according to the present invention with reference to FIGS. through 9.

Figure 1:
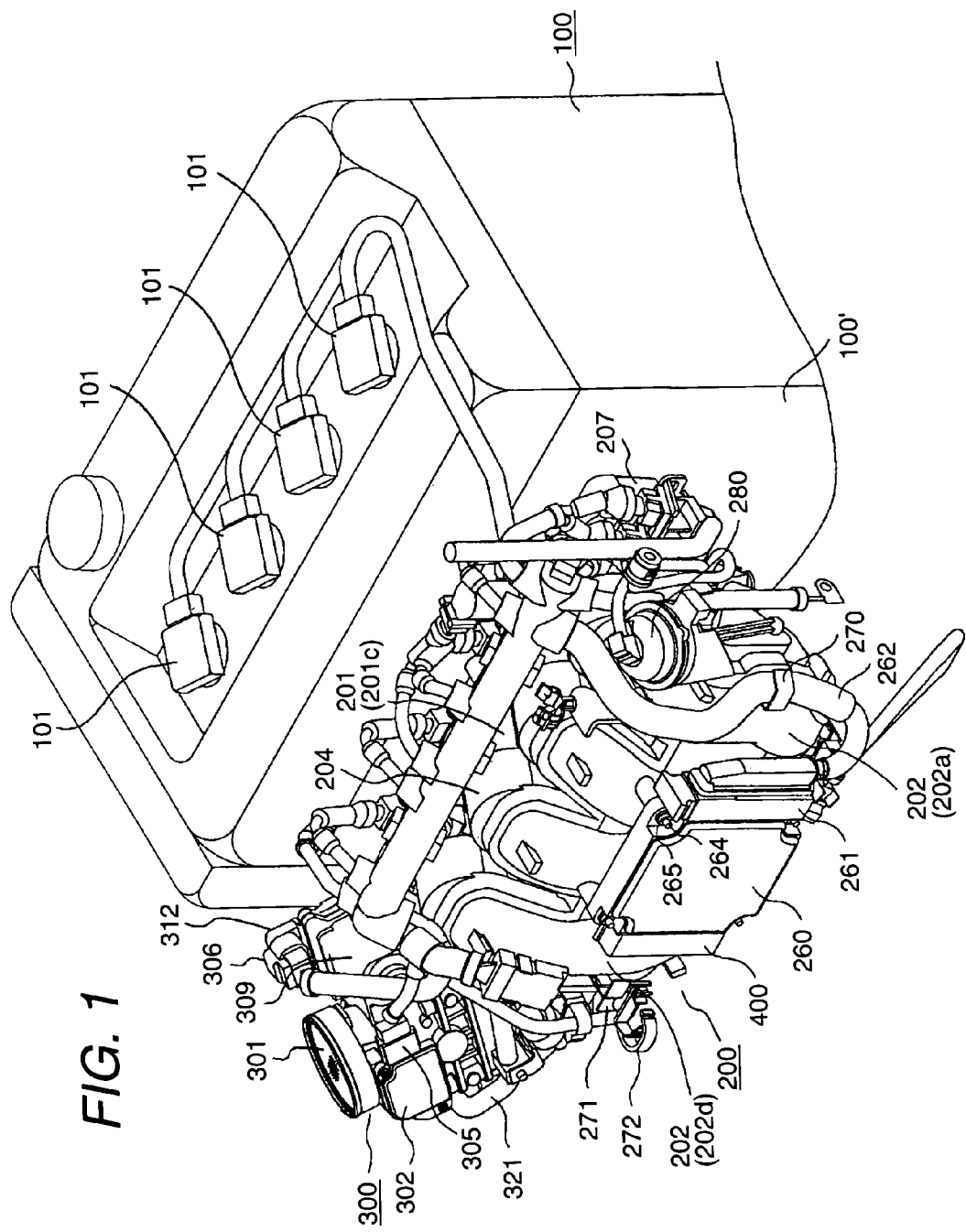
FIG. 1 is a perspective view representing an internal combustion engine intake module mounted on an engine block.
Figure 2:
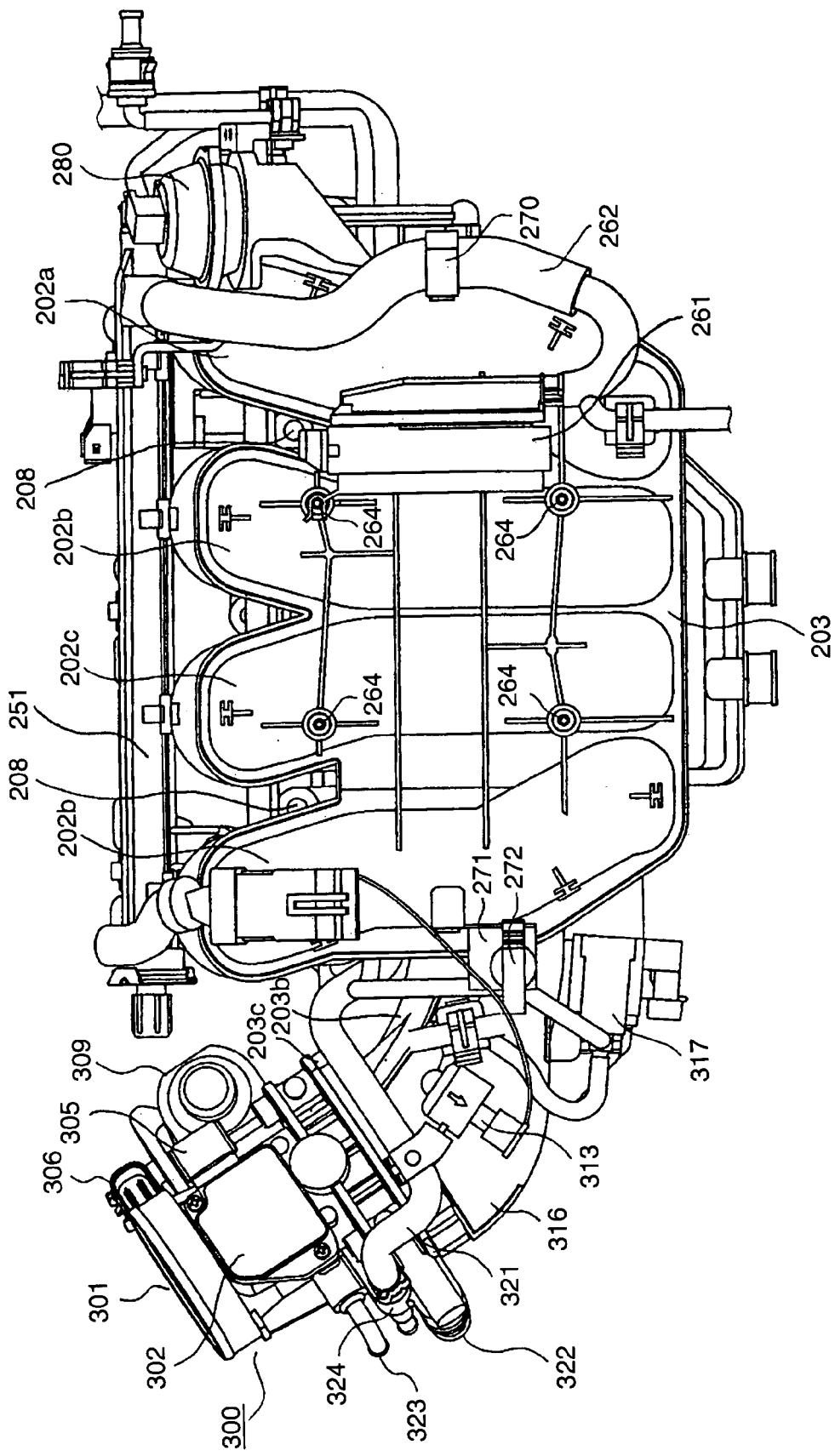
FIG. 2 is a front view representing an internal combustion engine intake module removed from the engine block and an ECU removed from the internal combustion engine intake module.
Figure 3:
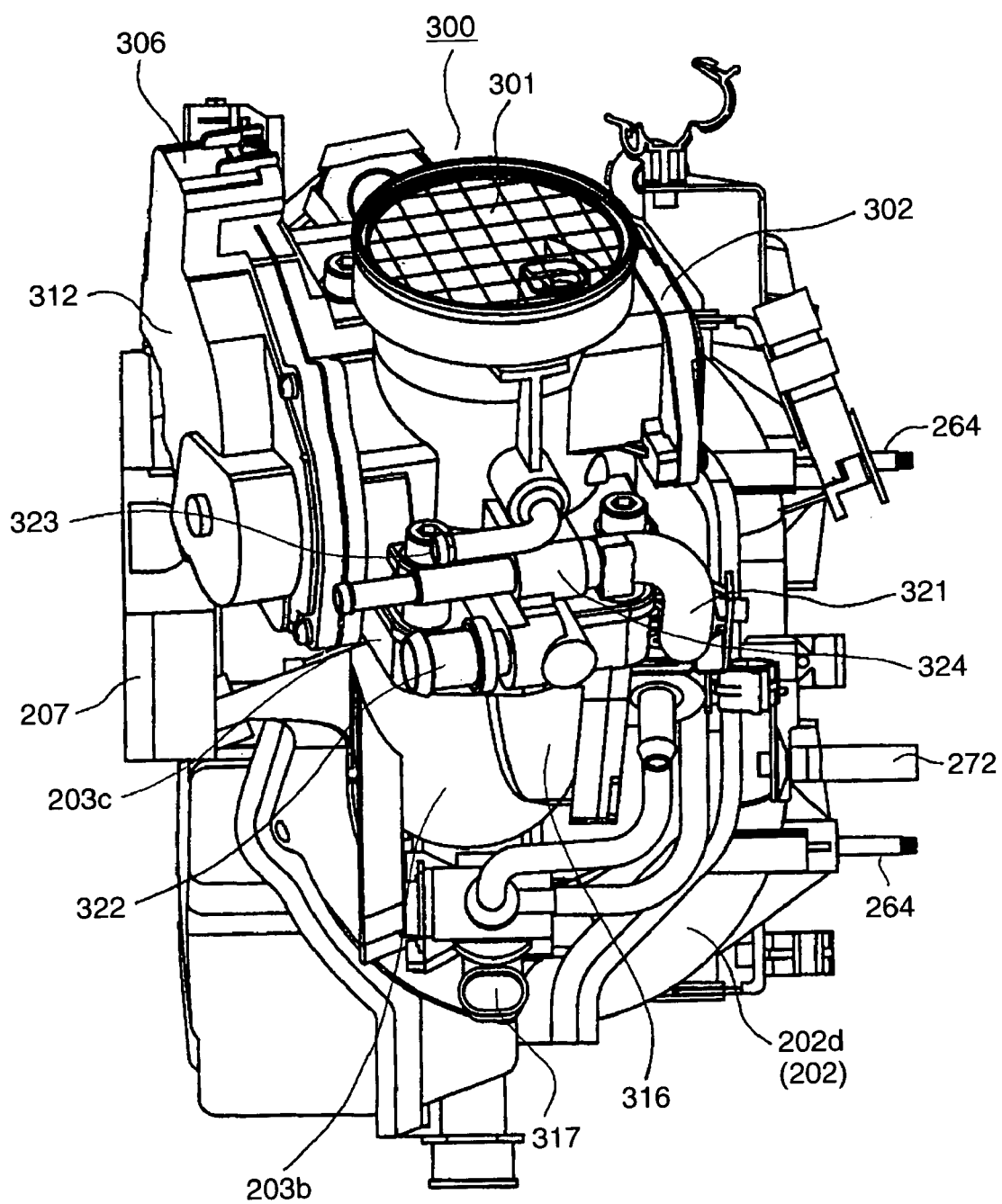
FIG. 3 is a left side view of FIG. 2.
Figure 4:
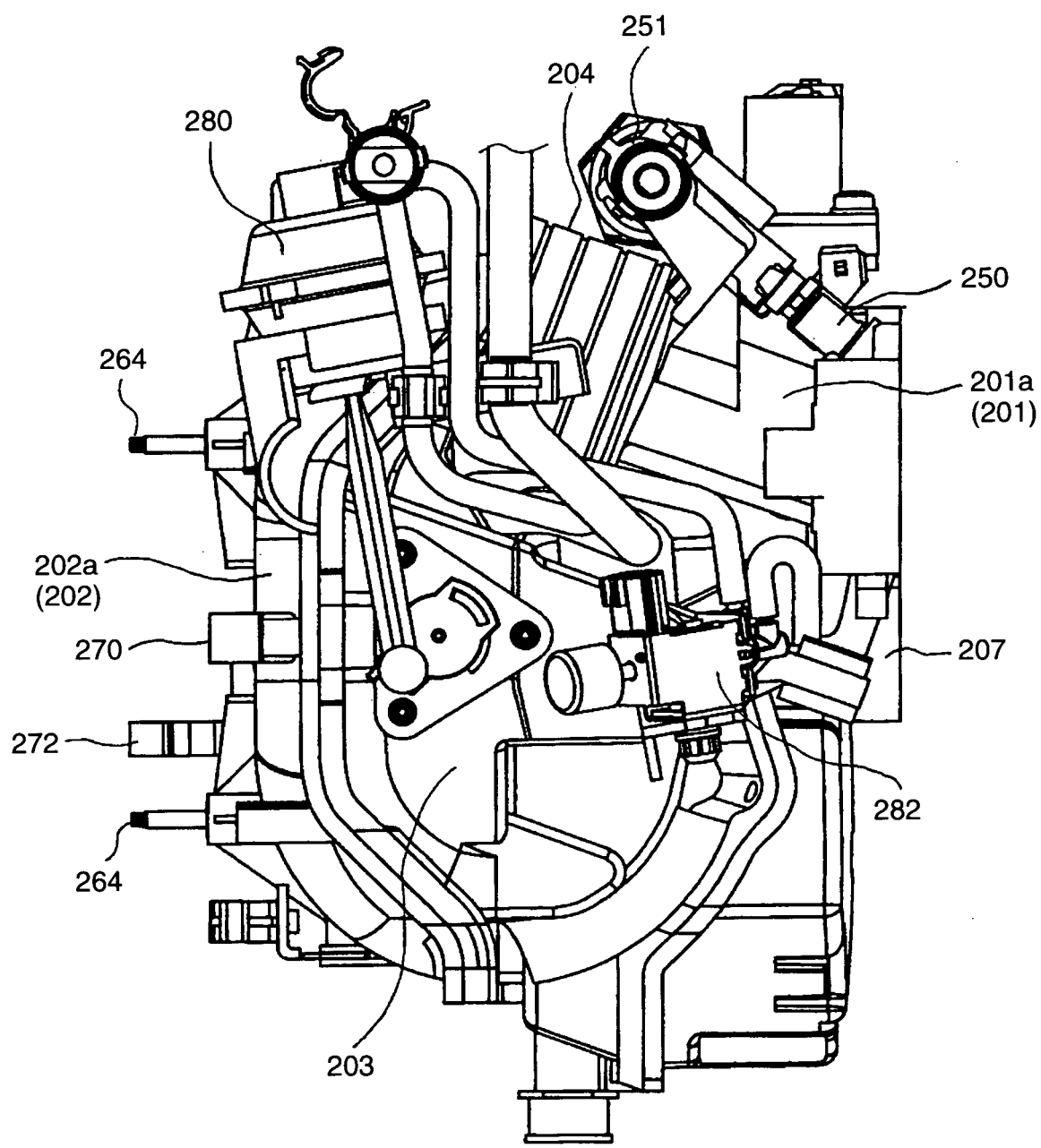
FIG. 4 is a right side view of FIG. 2.
Figure 5:
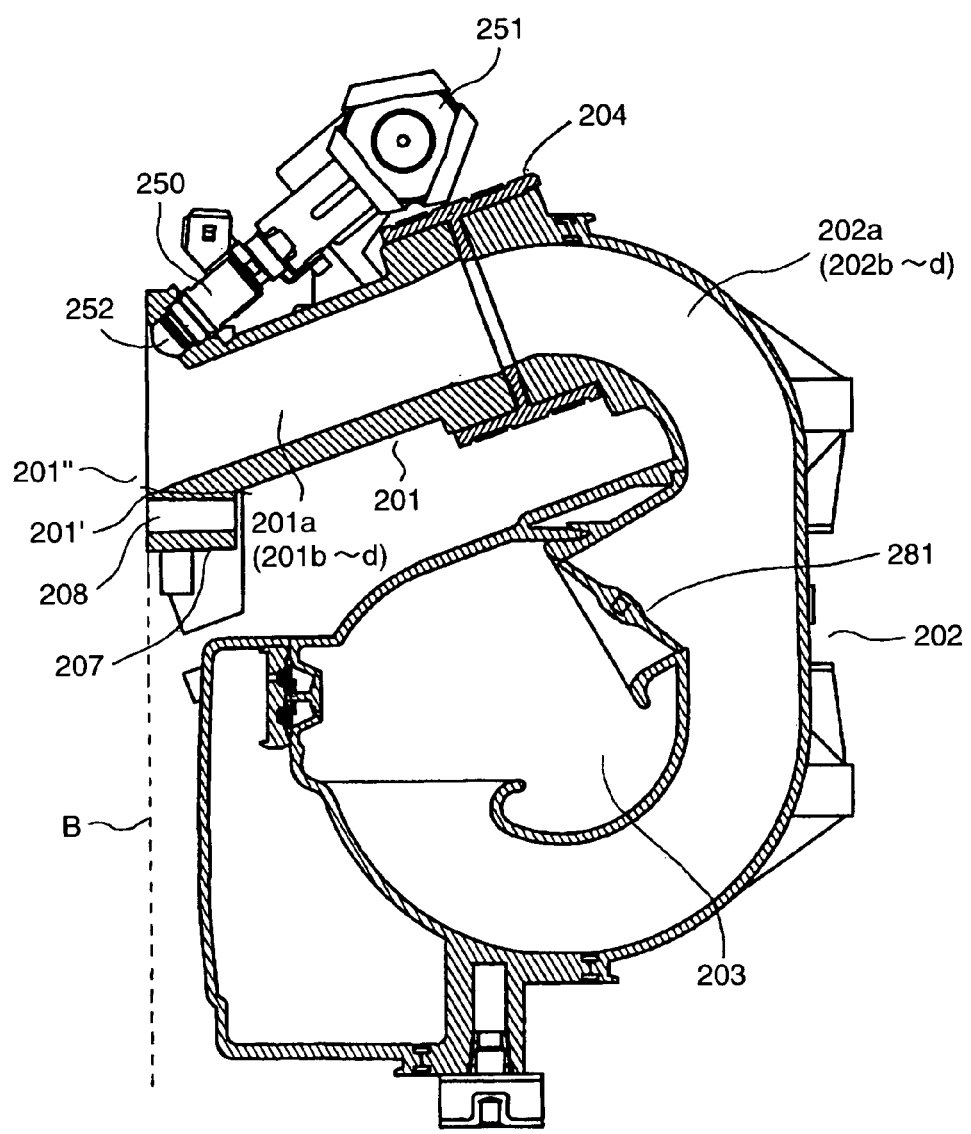
FIG. 5 is a vertical cross sectional view of an intake manifold and a collector as the main units of an internal combustion engine intake module as an embodiment of the present invention.
Figure 7:
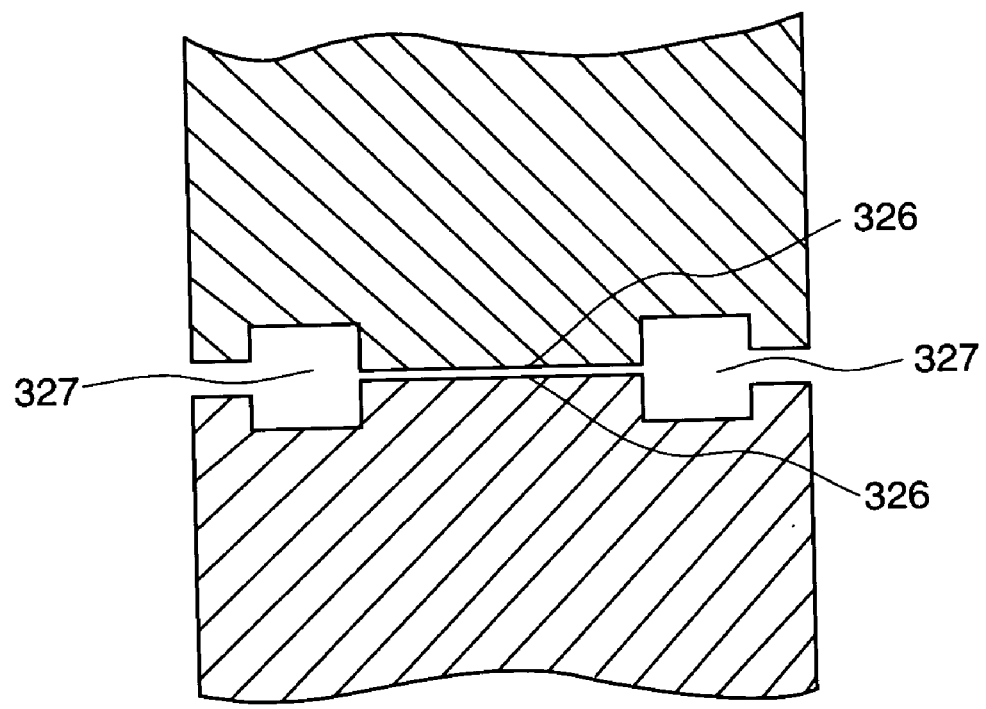
FIG. 7 is a cross sectional view representing bonding structure of synthetic resin as an embodiment of the present invention.
Figure 8:
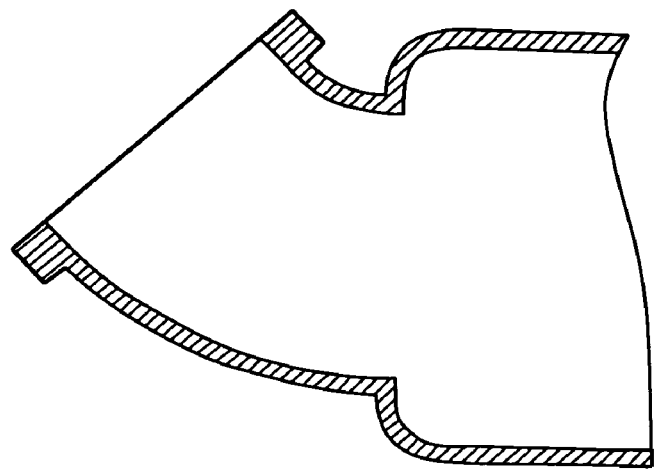
FIGS. 8 and 9 are cross-sectional views of the collector on the electronically controlled throttle body side.
Figure 9:
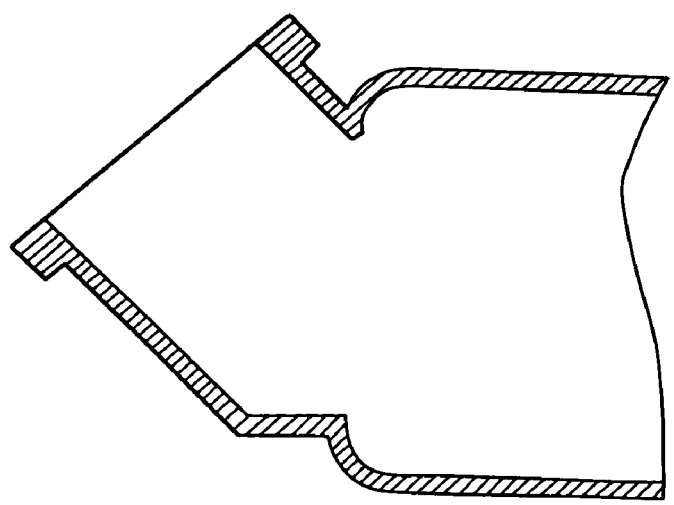

FIG. 1 is a perspective view representing an internal combustion engine intake module 200 mounted on an engine block 100. FIG. 2 is a front view representing he internal combustion engine intake module 200 removed from the engine block 100 and the ECU removed from the internal combustion engine intake module 200 (ECU 260 is incorporated as an element of the internal combustion engine intake module in FIG. 1). FIG. 3 is a left side view of FIG. 2. FIG. 4 is a right side view of FIG. 2. FIG. 5 is a vertical cross sectional view of intake manifolds 201 and 202, negative tank 312 and collector 203 as main units of an internal combustion engine intake module according to the present invention. FIG. 7 is a cross sectional view representing bonding structure of synthetic resin. FIGS. 8 and 9 are cross sectional views of the collector on the electronically controlled throttle body side. In the internal combustion engine intake module 200 according to the present embodiment, the parts of the intake system as well as part of the fuel system, ECU 260 and various harnesses of electric system are each formed into one module (integration, unitization) wherever possible in order to ensure streamlined car assembly and transfer work, compact designing, improved implementation, reduced costs, reduced hardness resistance and minimized resistance. To achieve these goals, attempts have been made to give various considerations as given below.

The intake manifold 202 and collector 203 as main units of the internal combustion engine intake module 200 are molded integrally in one piece using the synthetic resin containing 30 wt %—or preferably 20 through 40 wt %—of glass fiber characterized by excellent heat resistance and mechanical strength. The synthetic resin to be used includes epoxy resin, polyacetal resin, nylon resin, polyethylene terephthalate resin and polybutylene terephthalate resin. Use of thermoplastic resin is preferred. Other types of fiber used include ceramic, metal and carbon fibers.

The intake manifold 201 connected to the engine side in particular is preferred to be made of the diecast material of aluminum group alloy equivalent to the ADC12 specified in the Japanese Industrial Standards. In terms of weight, the manifold used contains 4.5 through 13.0 wt % of Si. The manifold containing 0.5 wt % of at least one of Cu, Mg, Zn, Fe, Mn and Ni is also used. Further, such a manifold contains 1.0 through 4.0 wt % of the aforementioned Cu. A flange 314 thicker than the shell portion is provided on the side of the aforementioned synthetic resin-made intake manifold 202. The connected portion is connected to a flange 315 thicker than the shell portion similarly provided on the intake manifold 202 integrally formed with the connector 203, using a rubber-made connecting pipe 204. Both ends of the rubber-made connecting pipe 204 are locked in place by metallic bands 318. The rubber-made connecting pipe 204 has a spacer 319 between flanges of the two.

As shown in FIGS. 2 and 5, the collector 203 is connected with intake manifolds 201 and 202 that will be independent intake pipes as synthetic resin-made molded products, wherein these intake manifolds are connected in parallel. They are located inside and formed in an oblong shape.

The intake manifolds 201 and 202 for four cylinders according to the present embodiment are given as examples. They are composed of independent intake pipes 201a, 202a, 201b, 202b, 201c, 202c, 201d and 202d, without being restricted thereto. They can correspond to cylinders in various numbers. As shown in a joint 313, the collector 203 and intake manifold 202 are made integral with each other by thermal compression bonding through pressure vibration, and the joint 313 has the structure shown by the outer periphery of the intake manifold 202 before connection in FIG. 2. As shown in the cross sectional view of FIG. 7, the joint 326 is connected onto the connecting surfaces of each other by thermal compression bonding through pressure vibration. There is a space 327 for storing the portion removed by pressure at the time of connection.

As shown in FIG. 5, the negative tank 312 where negative pressure is produced by engine rotation is mounted on the lower portion of the collector 203 on the engine side. It is made of the aforementioned synthetic resin containing fiber, and is bonded to collector 203 and intake manifold 202 by thermal compression.

Each of the independent intake pipes 201a through 201d and 201 through 202d has a curved shape as shown in FIG. 5. One end of each independent intake pipe (Top side end; opposite to the collector 203) constitutes an intake port periphery. The surface 201 of one end 201' of this independent intake pipe is connected to the periphery of the intake port on the engine block 100 side through a seal.

The ends 201' of the independent intake pipes are connected with flanges 207 formed integrally with these ends 201' side by side. The flange 207 is equipped with a hole 208 for mounting the internal combustion engine intake module. The mounting hole 208 is arranged on the periphery of each intake port.

A stud bolt previously mounted on the engine block is passed through this mounting hole 208, and is tightened by a nut. When the intake manifolds 201 and 202 are connected using a rubber connecting pipe, the internal combustion engine intake module 200 is fixed onto the engine block 100', as shown in FIG. 1. The surface formed by extending downward the one end 201" of the independent intake pipe 201 given in FIG. 5 (i.e. the surface perpendicular to the paper surface, passing through broken line B) is equivalent to the engine block side wall surface 100' when the internal combustion engine intake module 200 is mounted onto the engine block side wall 100'. Accordingly, as is apparent from FIG. 5, the collector 203 is located backward from the one end surface 201" of the independent intake pipe, as viewed with reference to the engine block side wall surface 100', to ensure that it does not contact the engine block side wall surface 100'.

On the one ends (the top ends 201') of the independent intake pipes 201a through 201d, injector mounting holes 252 are formed in the direction of an intake port. Injectors are mounted through these holes, as shown in FIGS. 1 and 5. A fuel gallery (fuel supply pipe) 251 is mounted on the other ends of injectors 205, and is fixed on the intake manifold 201, constituting part of the internal combustion engine intake module 200.

The independent intake pipe 202 is provided with a variable Intake valve that is opened or closed by a negative diaphragm 280. The three-way solenoid 282 is switched in response to the signal sent from the ECU 260, and the negative pressure for negative diaphragm 280 is switched, whereby the variable intake valve 281 is actuated and an adequate intake pipe length is obtained in conformity to the engine load condition. In this case, the negative pressure supplied to the negative diaphragm 280 is supplied from the negative tank built integrally with the resin intake manifold through the three-way solenoid 282. The one end 203' of the collector 203 along the length is protruded from one side of the intake manifold 202 along the length, as shown in FIG. 2. An air inlet 203b is formed integrally with the collector on the top surface of the collector at this protruded position. The air inlet 203b is tilted in the direction of going further away from the intake manifold 202, as it extends upward.

The opening of the air inlet 203b of the collector 203 faces upward and the flange 203c (see FIG. 2) on the periphery of the opening is tilted to form a falling inclination as viewed from the intake manifold 202. Accordingly, the opening of the air inlet 203b is also tilted to form a falling inclination, as viewed from the intake manifold 202.

The air inlet 203b of this collector 203 is located on the side of the intake manifold 202, and the electronically controlled throttle body 300 is mounted on the opening flange 203c of this air inlet 203b. The electronically controlled throttle body 300 is tilted in the same direction as that of the air inlet 203b on the collector side. (To be more specific, it is tilted to form a falling inclination as viewed from the intake manifold 202).

As described above, when the air inlet 203b and electronically controlled throttle body 300 is tilted to have a specified inclination, an upwardly expanding space is provided between the electronically controlled throttle body 300 and intake manifold 202. This space is utilized to install a motor housing 309 between the electronically controlled throttle body 300 and intake manifold 202.

As described above, the air inlet side of the collector 203 is protruded from the intake manifold 202 in a lateral direction, and the air intake 203b and electronically controlled throttle body 300 are arranged on the top surface of this projection. This arrangement provides an internal combustion engine intake module wherein the electronically controlled throttle body 300 with a motor, intake manifolds 201 and 202 and collector 203 are formed in a compact size. Further, this arrangement allows the electronically controlled throttle body 300 to be mounted close to the intake manifold 202, thereby reducing the distance between the collector 203 and air inlet 203c. Thus, a resin-made passage built integrally with the collector 203 leading from the collector 203 to the air intake 203c can be kept strong and firm against engine vibration and the like.

If the aforementioned slope is given to the air inlet 301 of the electronically controlled throttle body 300, the curvature (radius) of the duct can be increased minimize the intake resistance of the duct when an intake duct (not illustrated) is mounted on this air inlet 301 from an upwardly inclined position. In FIG. 2, the outer wall of the intake manifold 202 is provided with an auxiliary jig 272 and brackets 270 and 271 for holding part of the harness (not illustrated) other than the module element of the internal combustion engine intake module 200. The harness other than this module element is designed to be electrically connectable with a connector terminal 400 installed on the other side of the ECU 260 given in FIG. 1 through the connector (not illustrated) on the harness side. In FIG. 1, a connection terminal similar to the aforementioned connector terminal 400 is installed on the other side of the ECU 260. (This connector is not visible in FIG. 1 since a connector 261 on the harness 262 side mounted on the internal combustion engine intake module 200 is connected so as to cover this connector terminal).

The electronically controlled throttle body 300 is mounted on the collector 203 through a blow-by gas passage 316, and a throttle valve 328 is installed inside. The outer wall is provided with a circuit board 303 of the AFM 302 for detecting the amount of intake air, a TPS (not illustrated) for detecting the opening of the throttle valve, a cover 312 for protecting the gear (not illustrated) for transmitting the drive power from motor to the throttle valve 328, a PCV valve 322, a fresh air feeding nipple 325, a warm water pipe 321 and others. The warm water pipe 321 is mounted on a thermoelectric element 324 of the electronically controlled throttle body 300, and heat is given to the electronically controlled throttle body 300 through part of the engine coolant (warm water) introduced through the pipe, thereby preventing the throttle valve from being frozen during operation under cold climates. The motor is installed in a motor housing 309. The electronically controlled throttle body 300 is installed in an upward facing direction on the passage of the blow-by gas 316 installed also in an upward facing direction from the collector 203. The motor housing 309 is installed inside the electronically controlled throttle body 300 integrally therewith. Further, the electronically controlled throttle body 330 is made of the diecast material of aluminum group alloy, similarly to the aforementioned case.

The collector 203 on the side of electronically controlled throttle body 300 is curved in the upward direction, as shown in FIGS. 2 and 8, and is tilted about 56 degrees on the center axis line of the electronically controlled throttle body 300. Upward curvature, as described above, allows the electronically controlled throttle body 300 itself and the heavy motor to be installed on the side of lower gravity center, thereby reducing their weight and ensuring a lightweight configuration. Further, this arrangement allows these wires and connector to be concentrated in the same direction, thereby ensuring overall compact designing.

These effects are slightly reduced by adopting the inclined structure as shown in FIG. 9, but similar effects can be ensured. Further, the collector 203 on the side of the electronically controlled throttle body 300 is designed to have a smaller diameter than that on the side of the intake manifold 202. The diameter is almost the same on the side of the electronically controlled throttle body 300 and on the side of the intake manifold 202. Flanges are used for mechanical connection with the electronically controlled throttle body 300.

It is preferred that each flange be integrally formed with connection bolts although not illustrated in either FIG. 8 or 9.

The circuit board 303 for the control of the AFM 302 is accommodated in a casing, and the AFM 302 is screwed onto the side wall opposite to the engine side of the electronically controlled throttle body 300. Since this side is opposite to the motor side, the influence of vibration can be minimized, and higher precision control can be obtained. The AFM 302 is a thermal type air flow meter, for example, and a sub-air passage (not illustrated) for air flow rate measurement is installed on the main passage inside the electronically controlled throttle body 300.

These mounted parts are laid out with consideration given to integration features in modularization. For example, the motor 310 mounted on the electronically controlled throttle body 300 is composed of a housing integrally built with the electronically controlled throttle body 300, and is located between intake manifolds 201 inside the aforementioned curvature or inclination.

As shown in FIG. 1, a connector 306 for wiring of the motor for driving the electronically controlled throttle and a connector for wiring of the throttle rotary angle sensor are formed integral with each other. The integrally built connector has its terminal inlet arranged on the electronically controlled throttle body 300 in the direction opposite to the engine side. As shown in FIG. 1, the connector 306 for wiring of the motor for driving the electronically controlled throttle and the connector for wiring of the throttle rotary angle sensor are formed integral with each other. The integrally built connector has its terminal inlet arranged on the electronically controlled throttle body 300 in the direction opposite to the engine side. The direction of the terminal inlet to a connector 305 for wiring of the air flow meter 302 for detecting the amount of intake air mounted on electronically controlled throttle body 30 is the same as the terminal inlet to the integrally built connector. Thus, they are oriented to allow integrated wiring at the same wiring position, thereby reducing the length of wiring and hence ensuring compact designing. The connector 305 for AFM 302 for detecting the amount of intake air installed on the electronically controlled throttle body 300 built in the internal combustion engine intake module 200 as a module element, power supply for motor 310, and connector 306 or the TPS 304 for detecting the throttle valve rotary angle are arranged at opposite positions, as viewed from the wall surface 1000 on the engine block where the internal combustion engine intake module 200 is mounted. This arrangement allows the electronic parts to be installed away from the engine block, thereby ensuring reliability of the electronic parts.

Further, the connector 305 for AFM mounted on the electronically controlled throttle body 300, the TPS and the motor connector 306 are arranged close to each other to permit integrated wiring.

At the tip of the air inlet 203b of the collector 203 along the length, a blow-by gas passage 316 is curved in the upward facing position by the resin integral with the collector 203 as described above, and is formed at an inclination of 56 degrees. The inlet of this blow-by gas passage 316 communicates with the PCV valve 322 on the side of the electronically controlled throttle body 300. The outlet is located inside the collector 203. The blow-by gas fed inside through the PCV valve 322 is fed into the collector 203 through this blow-by gas passage 316.

A vacuum take-up nipple 313 for brake booster is arranged on one side of the outer wall of the air inlet 203b of the collector 203. This nipple 31 is also incorporated as a module element of the internal combustion engine intake module.

In the present embodiment, the ECU 260 and its harness 262 are also incorporated as a module element of the internal combustion engine intake module 200, as shown in FIG. 1. the packaging density and number of modules are increased to provide a compact configuration.

To be more specific, ECU 260 is removably mounted on the wall surface of the main unit of the internal combustion engine intake module 200, as shown in FIG. 1. The harness 262 consisting of wiring unitized through connector 260 is integrally formed on the ECU 260 as a module element, and is fixed on the front wall surface of the intake manifold 202. In the present embodiment, four intake manifolds arranged in parallel on the collector 203 are connected with the electronically controlled throttle body 300. It has wiring to the motor for driving the throttle installed rotatably on the electronically controlled throttle body 300, wiring to a sensor for detecting the rotary angle of the throttle, wiring to an air flow meter for detecting the amount of intake air, wiring to a fuel injection valve installed on the intake manifold, wiring from an engine control unit, and wiring to an ignition plug installed on the engine. A fixing means for fixing them in position is mounted on the top portion of the intake manifold, and is used to secure the harness in position. As described above, each wire is installed in the same direction as the ECU 260 to be described later, and this arrangement allows the entire parts to be integrated as a harness, thereby reducing the length and ensuring a compact configuration.

To install the ECU 260, multiple (e.g. four) stud bolts 264 are arranged for constituting the module proper. These stud bolts 264 are engaged into the installation holes formed on the ECU 260, and nuts 206 are tightened to fix the ECU 260 in position. For example, the ECU 260 has to be removed or re-installed for maintenance and replacement after the internal combustion engine intake module 200 has been mounted in the engine room. In such cases, if the ECU 260 is fixed using the stud bolt 264 and nut 265 as described above, the ECU 260 can be removed or re-installed by loosening or tightening the nut 265 with a spanner from above the engine room. Even where there are a great number of parts, the ECU can be removed and re-installed without interfering with other parts. The semiconductor element mounted on the ceramic substrate is sealed by resin, and the ceramic substrate is bonded to an aluminum or cupper radiator plate. The ECU 260 is fixed with a space left in the intake manifold as described above. This arrangement provides easy thermal dissipation free from direction vibration.

Further, a canister purge valve 317 is installed on the collector 203 side of the blow-by gas passage 316, as shown in FIG. 2, and a reinforcing member 329 is integrally formed by the aforementioned synthetic resin also to reinforce the blow-by gas passage 316. To support the entire load of the an internal combustion engine intake module, two legs 332 are provided on the lower portion of the reinforcing member for reinforcing the entire intake manifold 202 provided on the lower portion of the intake manifold 202.

According to the embodiment of the reinforcing member for reinforcing the entire intake manifold 202 described above, compact size and light weight of a car are provided by increasing the number of module elements. At the same time, the harness of the electrical system is integrated to simplify the car assembling work. This arrangement also simplifies the ever-increasing density in the engine room, and ensures a greater space available in the engine room, whereby the packaging density of parts in the narrow engine room is further improved.

Further, the harness length can be reduced by modularization of control equipment such as ECU, controlled parts such as electronically controlled throttle body and various sensors.

The internal combustion engine intake module is mounted on the engine block 100, hence the harness can be connected at a position close to the electrical parts (such as ignition coil). This arrangement reduces the harness length, and hence reduces the entire harness resistance and promotes resistance against noise.

According to the aforementioned embodiment, in the internal combustion engine intake module of an internal combustion engine in a car, the load on weight is reduced by optimizing the arrangement position of the motor and air flow meter with respect to the electronically controlled throttle body. This makes it possible to produce the intake manifold and collector using synthetic resin, with the result that a lightweight and compact internal combustion engine intake module can be produced. Moreover, wiring length can be reduced by optimization of the wiring and connector positions, and the production process in wiring work can be cut down by modularization of wiring. Modularization of wiring also improves reliability of the wiring and entire system.

The aforementioned arrangement improves packaging density in an internal combustion engine intake module system, simplifies the step of mounting the system on a car, improves the convenience of transportation, provides compact configuration and light weight, and enhances a storage capacity. Further, modularization of the harness promotes lower resistance due to reduced length of the harness itself and improves noise resistance, thereby ensuring a high degree of reliability.

What is claimed is:

1. An internal combustion engine intake module, comprising:
   a collector,
   an electronically controlled throttle body connected to said collector, and
   a plurality of intake manifolds connected parallel to and integrally with said collector, wherein the collector is configured so as to be bent upward on the side of the electronically controlled throttle body, and a motor for driving the electronically controlled throttle is provided on said body integrally with an inner side of said bent side.

2. An internal combustion engine intake module according to claim 1, wherein said collector has a slope that is upwardly tilted 45 degrees or more on the electronically controlled throttle body side, the diameter of the slope is smaller than that of the intake manifold and is almost the same on the electronically controlled throttle body side and the intake manifold side, and the motor for driving the electronically controlled throttle is provided integrally with the inner side of said bent side.

3. An internal combustion engine intake module according to claim 1, wherein the collector and
   intake manifolds are made of synthetic resin containing a fiber and the intake manifolds are partly integrally formed by bondage.

4. An internal combustion engine intake module according to claim 1, wherein said intake manifolds are divided into at least two groups, i.e. on the engine side and collector side, and the collector and intake manifolds on the collector side are made of synthetic resin containing a fiber.

5. An internal combustion engine intake module according to claim 1, wherein the intake manifolds are divided into at least two groups on the engine side and collector side, the collector and intake manifolds on the collector side are made of synthetic resin containing a fiber, and the intake manifolds on the engine side is made of aluminum group alloy casting.

6. An internal combustion engine intake module according to claim 1, wherein the collector and intake manifolds are made of synthetic resin, and an air flow meter for detecting the amount of sucked air is arranged on said body on the side opposite to the engine.

7. An internal combustion engine intake module according to claim 1, wherein the collector and intake manifolds are made of synthetic resin, the wiring connector of the motor for driving the electronically controlled throttle body and the wiring connector of the rotary angle sensor of the throttle are formed integrally with each other, and said integrally formed connector has its terminal inlet arranged on the body opposite to the engine.

8. An internal combustion engine intake module according to claim 1, wherein
   the collector and intake manifolds are made of synthetic resin,
   the wiring connector of the motor for driving the electronically controlled throttle and the wiring connector of the rotary angle sensor of the throttle are formed integrally with each other,
   said integrally formed connector has its terminal inlet arranged on the body opposite to the engine, and
   the direction of the inlet of the terminal to wiring connector of an air flow meter for detecting the amount of sucked air is arranged in the same direction as the terminal inlet to the integrally formed connector.

9. An internal combustion engine intake module according to claim 1, wherein the harness with an integral unit comprising wires are fixed on the top of the intake manifold, said wires consisting of;
   a wire connected to the motor for driving the throttle rotatably installed on the body,
   a wire leading to the sensor for detecting the rotary angle of the throttle,
   a wire leading to the air flow meter for detecting the amount of sucked air,
   a wire leading to the fuel injection valve installed on the intake manifold,
   a wire leading from the engine control unit, and a wire leading to a spark plug installed on the engine.

10. An internal combustion engine intake module according to claim 1, wherein the plurality of intake manifolds are arranged parallel to a collector and a variable intake valve is arranged on each of the intake manifolds between the collector and intake manifold, the collector and intake manifolds being made of synthetic resin containing a fiber and the intake manifolds being integrally formed by bonding.

11. An internal combustion engine intake module according to claim 1, wherein the plurality of intake manifolds are arranged parallel to a collector, a variable intake valve is arranged on each of the intake manifolds between the collector and intake manifold, and a negative pressure tank is provided as a drive source of the variable intake valve the collector, intake manifolds and negative tank being made of synthetic resin containing a fiber, and the intake manifolds and negative tank are integrally formed by bonding.

12. An internal combustion engine intake module according to claim 1, wherein the plurality of intake manifolds are arranged parallel to a collector, a variable intake valve is arranged on each of the intake manifolds between the collector and intake manifold, and a negative pressure tank is provided as a drive source of the variable intake valve
   the collector, intake manifolds and negative tank being made of synthetic resin containing a fiber,
   the intake manifolds and negative tank being integrally formed by bondage bonding, and
   an engine control unit being installed on the engine side of the intake manifold.

* * * * *